United States Patent
Loftus et al.

(10) Patent No.: US 10,462,297 B2
(45) Date of Patent: Oct. 29, 2019

(54) SYSTEM AND METHOD FOR AUTOMATED DETERMINING WHEN TO REVIEW AN AGENT RESPONSE PROCESS

(71) Applicant: Avaya Inc., Santa Clara, CA (US)

(72) Inventors: Liam Loftus, Knocknacarra (IE); Neil O'Connor, Lackagh (IE); John McGreevy, Roscam (IE); Seamus Hayes, Clarinbridge (IE)

(73) Assignee: Avaya Inc., Santa Clara, CA (US)

( * ) Notice: Subject to any disclaimer, the term of this patent is extended or adjusted under 35 U.S.C. 154(b) by 71 days.

(21) Appl. No.: 14/592,257

(22) Filed: Jan. 8, 2015

(65) Prior Publication Data
US 2016/0205250 A1    Jul. 14, 2016

(51) Int. Cl.
*H04M 3/51*   (2006.01)
*G06Q 10/06*   (2012.01)

(52) U.S. Cl.
CPC .... *H04M 3/5175* (2013.01); *G06Q 10/06398* (2013.01)

(58) Field of Classification Search
CPC ............................ H04M 3/5175; H04M 3/51
USPC .................................................. 379/265.06
See application file for complete search history.

(56) References Cited

U.S. PATENT DOCUMENTS

| | | | |
|---|---|---|---|
| 6,542,602 B1* | 4/2003 | Elazar | H04M 3/5183 379/265.06 |
| 8,160,233 B2* | 4/2012 | Keren | H04M 3/5175 379/265.05 |
| 9,674,358 B1* | 6/2017 | Daddi | H04M 3/5175 |
| 2004/0172310 A1* | 9/2004 | Atlee | G06F 17/243 705/4 |
| 2008/0063178 A1* | 3/2008 | Paden | H04M 3/5175 379/265.06 |
| 2009/0089135 A1* | 4/2009 | Minert | G06Q 10/06311 705/7.13 |
| 2012/0177196 A1* | 7/2012 | Geva | H04M 3/51 379/266.07 |

* cited by examiner

*Primary Examiner* — Ahmad F. Matar
*Assistant Examiner* — Jirapon Intavong

(57) ABSTRACT

A method and system automatically determines when to review an agent response. The method performed by an oversight device includes receiving first data including a request type of a request received by a contact center. In response to the first data, the method includes automatically determining rules corresponding to the request type, the rules indicating required steps performed by an agent for the request type. The method includes receiving second data corresponding to a response process used by the agent in generating a response to the request, the response process including performed steps performed by the agent for the request. In response to the second data, the method includes automatically determining whether the required steps are included in the performed steps of the response process. The method includes forwarding the response to a supervisor device when the required steps are absent from the performed steps of the response process.

20 Claims, 5 Drawing Sheets

SYSTEM AND METHOD FOR AUTOMATED DETERMINING WHEN TO REVIEW AN AGENT RESPONSE PROCESS

BACKGROUND INFORMATION

A contact center may be used by a provider to enable a user to submit a query or request for an issue or a service handled by the provider. Specifically, an agent may be employed at the contact center who receives a ticket associated with the query/request, e.g., via email. The ticket may include relevant information for the agent to properly generate a response for the user. The agent may utilize any available resource to determine the proper response for the ticket. For example, the agent may rely upon proprietary tools, publicly available information, privacy information corresponding to the user, etc.

To ensure quality assurance, a contact center may employ a supervisor who is responsible for a group of agents and reviews the responses of these agents prior to transmission to the user. Specifically, when an agent attempts to transmit the response, the supervisor may intercept the response for review and determine whether the response is proper or acceptable for the query/request. Since the supervisor is unlikely to be able to review every response from each agent prior to transmission, a system may allow a statistical sampling to be used to determine a sample set of responses that need to be reviewed by the supervisor. However, such a system may bypass a response that should have been reviewed by the supervisor and further select a response that does not require any review by the supervisor. In addition, such a system utilizes the response as a finished product to only allow review of what is included in the response without any consideration of the process used to generate the response.

Thus, there is a need for a system to select responses to be reviewed by assessing the process an agent uses to solve the query/request and use this information to determine if the response should be reviewed.

DETAILED DESCRIPTION

Figure 1:
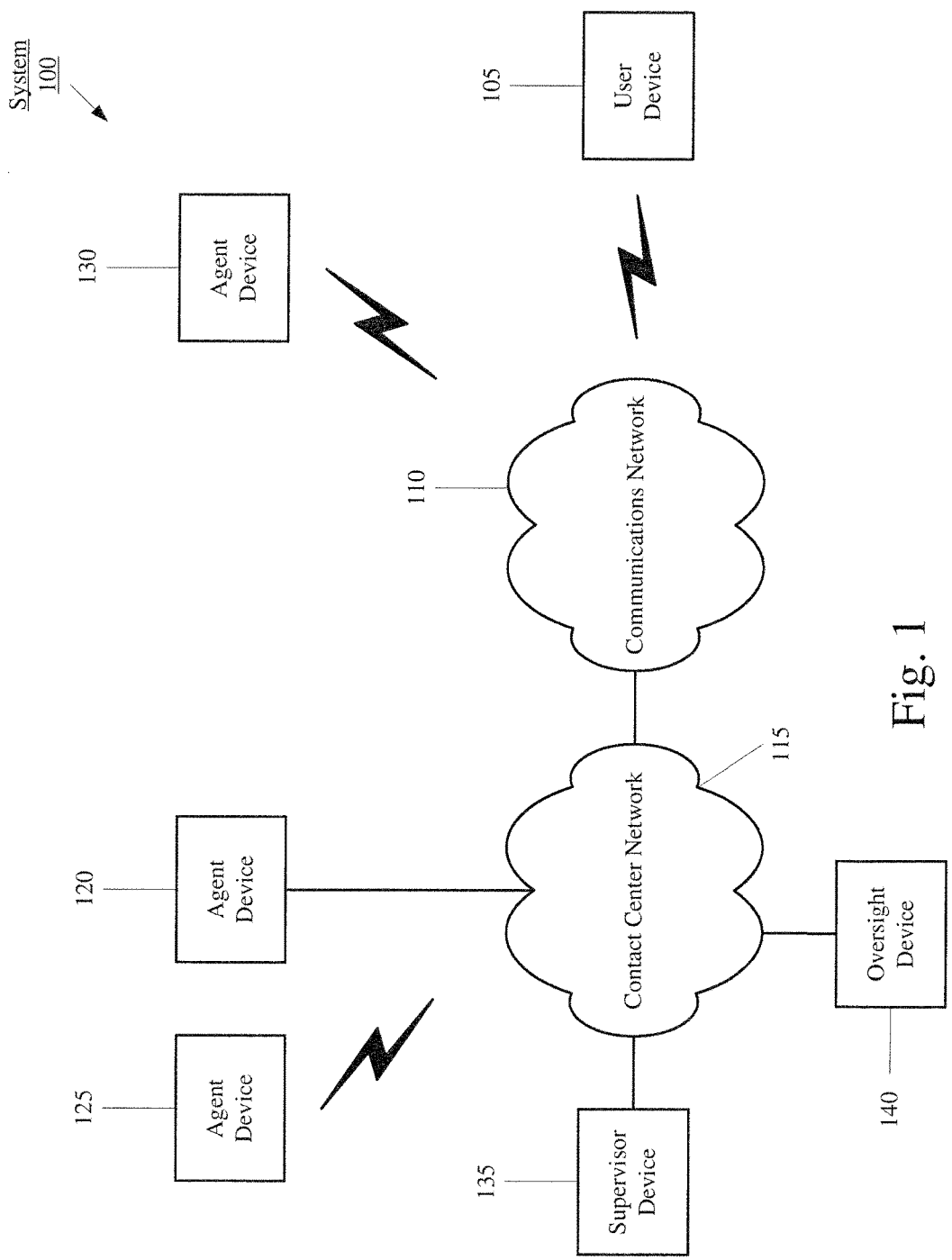
FIG. 1 shows an exemplary contact center system.

The exemplary embodiments may be further understood with reference to the following description and the related appended drawings, wherein like elements are provided with the same reference numerals. The exemplary embodiments are related to a system and method optimizing a supervisor's time by an automated selecting of agents' responses for review prior to the responses being completed or sent to a user. Specifically, the process that the agent of a contact center uses to generate the response for a ticket to a query or request provides at least a partial basis in which to select the response for review by the supervisor. The contact center, the supervisor, the agent, the ticket, the response, the process, and a related method will be described in further detail below.

Initially, it should be noted that the exemplary embodiments described herein relate to a contact center that receives queries or requests (herein collectively referred to as "requests"). However, those skilled in the art will understand that the exemplary embodiments may be applied to any system in which a process is used by an agent to determine a response to a request. Thus, the contact center used herein may represent any of these systems. It should also be noted that the use of a supervisor and agent is only exemplary. Those skilled in the art will also understand that the exemplary embodiments may be applied to any first user who uses the process to generate the response and any second user who may review the process and the response. Thus, the supervisor and the agent used herein may represent any first user and any second user, respectively. It should further be noted that the use of email is only exemplary including the format in which requests and responses are created as well as the non-real time nature of email. Those skilled in the art will understand that the exemplary embodiments may utilize any format for requests and responses to be transmitted between supervisors, agents, and users and that other communication formats may be used including real time ones such as a chat.

FIG. 1 shows an exemplary system 100 including a contact center and devices allowing a user to communicate with the contact center. The system 100 may include a communications network 110 and a contact center network 115 which are communicatively connected to one another. Accordingly, end devices connected to the communications network 110 and/or the contact center network 115 may communicate with each other. The system 100 may enable a user device 105 utilized by a user to transmit a request via the communications network 110 and the contact center network 115 to an agent device 120 utilized by an agent so that the agent may transmit back a response to the request. As will be described in further detail below, the system 100 may further include a supervisor device 135 and an oversight device 140.

The user device 105 may represent an electronic device which may be utilized by a user to transmit a request to the contact center network 115. For example, the user device 105 may be any electronic component that is configured to communicate, via the communications network 110, such as a desktop computer, a laptop, a smartphone, etc. The user device 105 is shown as wirelessly communicating with the communications network 110. However, it should be noted that the user device 105 may also connect to the communications network 110 using other means such as a wired connection. Accordingly, the user device 105 may include corresponding components to enter the request (e.g., an input/output (I/O) device), to connect to the communications network 110 (e.g., a transceiver), to transmit the request, etc.

The communications network 110 may represent any single or plurality of networks used by the user device 105 to communicate with the contact center via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network such as a Local Area Network (LAN), a Wide Area Network (WAN), Virtual LAN (V-LAN), etc. using any variety of radio access networks such as 3G, 4G, Long Term Evolution (LTE), WiFi, etc.

The contact center network 115 may enable a plurality of devices to be interconnected with one another. For example, the contact center network 115 may be a proprietary network accessible in one manner by the agent devices 120-130, the supervisor device 135, and the oversight device 140. Specifically, the agent devices 120-130, the supervisor device 135, and the oversight device 140 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via, e.g., a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network may include a server, a router, a switch center, a network management arrangement, a database, etc. It should also be noted that the use of three agent devices 120-130 is only exemplary. Those skilled in the art will understand that the contact center may utilize any number of agent devices. It should further be noted that the use of one supervisor device 135 is only exemplary. Those skilled in the art will understand that the contact center may utilize any number of supervisor devices to manage one or more agent devices.

Figure 2:
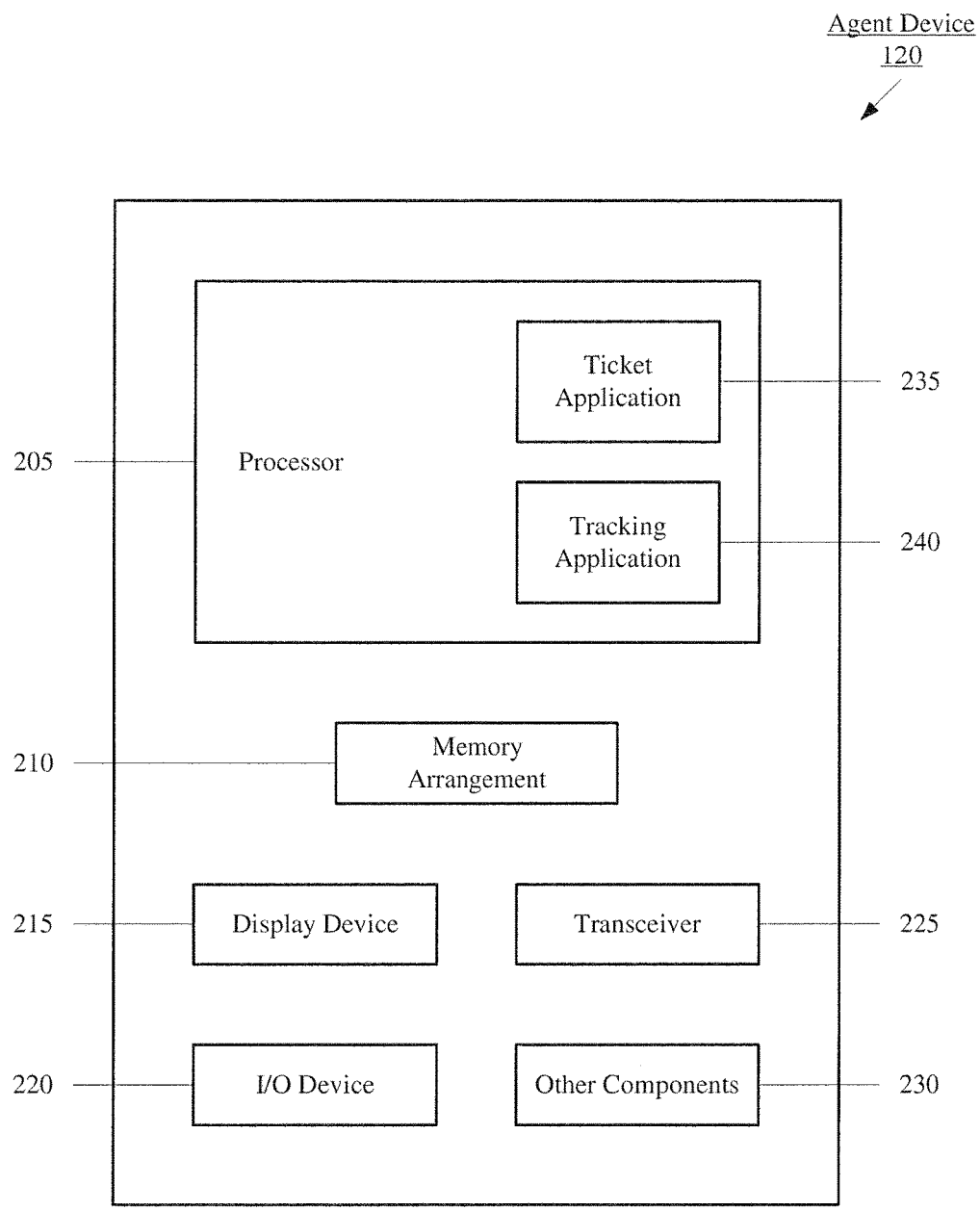
FIG. 2 shows an exemplary agent device of the contact center system of FIG. 1.

FIG. 2 shows the exemplary agent device 120 of the contact center system 100 of FIG. 1. As discussed above, the agent device 120 may be utilized by an agent to receive a request from a user via the user device 105. The agent may subsequently use a process to generate a response to be transmitted back to the user device 105. The description herein for the agent device 120 may be representative of the agent devices 125, 130 as well. The agent device 120 may also represent any electronic device that is configured to perform the functionalities described herein. For example, the agent device 120 may be a portable device such as a tablet, a laptop, etc. In another example, the agent device 120 may be a client stationary device such as a desktop terminal. The agent device 120 may include a processor 205, a memory arrangement 210, a display device 215, an I/O Device 220, a transceiver 225, and other components 230 (e.g., an audio input device, an audio output device, a battery, a data acquisition device, ports to electrically connect the agent device 120 to other electronic devices, etc.).

The processor 205 may be configured to execute a plurality of applications of the agent device 120. For example, the applications may include a web browser when connected to the contact center network 115 and also the communications network 110 the transceiver 225. In another example, the processor 205 may execute a call application that enables the agent device 120 to perform a call functionality. It should be noted that the call functionality may refer to any type of communication session. For example, the communication session may be an audio only call functionality (e.g., phone call), an audio/video communication functionality, etc. These types of applications may be used by the agent during the process to address the request to generate the response (hereinafter "response process").

In yet another example, the processor 205 may execute a ticket application 235. As will be described in further detail below, the ticket application 235 may receive the request from the user device 105 such as through a switch component or application used by the contact center network 115. The ticket application 235 may include a plurality of tools and receive other information determined from other applications such as those described above in the response process. In a further example, the processor 205 may execute a tracking application 240. The tracking application 240 may be a passive application such as one running in a background capacity. The tracking application 240 may communicate with the oversight device 140. As will be described in further detail below, the tracking application 240 may provide details of the response process for the oversight device 140 to determine whether the response requires review by the supervisor using the supervisor device 135.

It should be noted that the above noted applications each being an application (e.g., a program) executed by the processor 205 is only exemplary. The functionality associated with the applications may also be represented as a separate incorporated component of the agent device 120 or may be a modular component coupled to the agent device 120, e.g., an integrated circuit with or without firmware.

The memory arrangement 210 may be a hardware component configured to store data related to operations performed by the agent device 120. Specifically, the memory 210 may store data related to the web browser, the call application, the ticket application 235, and the tracking application 240. For example, the call application may utilize a contact list who may be experts or consultants required to reach during the response process. In another example, the response process being used by the agent may be stored in predetermined time intervals via the tracking application 240 for transmission to the oversight device 140. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the functionalities of the different applications being performed.

As described above, the agent devices 120-130 may execute the ticket application 235. Specifically, the user device 105 may transmit information included in a request such as in the form of a ticket to the contact center. The contact center network 115 may process the ticket and determine an appropriate agent to deliver the ticket. Those skilled in the art will understand that the selection of the agent may be performed in a variety of manners. For example, each agent may have qualifications and/or indicators associated with an agent identity. The ticket may be processed to determine any indicators or tags that are included therein. For example, the user device 105 may be prompted to select various fields while completing the ticket. The fields may include these indicators or tags. Therefore, the appropriate agent may be selected to have the request transmitted.

Once the agent device 120 receives the request, the agent may perform the response process to determine how to address the request. There are a variety of different ways including a variety of different mechanisms to use in which the response process may be performed as well as in a variety of different contexts based upon a product or service that the contact center is associated. For example, if the contact center relates to determining an insurance quote, the agent may utilize the ticket application 235 that may include a quote calculator that incorporates the information that the user has provided. Those skilled in the art will understand that any number of different tools and information may be used in the response process and that the exemplary embodiments may be applied to each of these different scenarios. For example, as discussed above, the ticket application 235 may include a plurality of tools or the agent may utilize further applications to receive information that may be used in the response process.

While the agent using the agent device 120 is performing the response process, the tracking application 240 may provide details of the response process for the oversight device 140 to determine whether the response requires review by the supervisor using the supervisor device 135. The tracking application 240 may perform this functionality in a variety of different manners. In a first example, the tracking application 240 may transmit the information of the response process continually to the oversight device 140. That is, when the agent begins the response process upon receiving the ticket, the tracking application 240 may also begin transmitting the information to the oversight device 140. In a second example, the tracking application 240 may transmit the information of the response process each time the agent performs a step. As discussed above, the agent may use a quote calculator. Thus, upon completing the use of the quote calculator, the tracking application 240 may transmit the information associated with this use to the oversight device 140. In a third example, the tracking application 240 may transmit the information of the response process based upon predetermined time intervals. That is, at a known time such as every preset number of minutes, the tracking application 240 may transmit all information of the response process that the agent has used to the oversight device 140.

It should again be noted that the ticket application 235 and the tracking application 240 may be used for any type of product or service that the contact center is associated. The exemplary embodiments may be applied in each of these instances and provide the functionalities described herein without significant modifications thereto. For example, the contact center may be used for any product or service ranging from sales, insurance, customer service, etc. and the exemplary embodiments may be used therewith.

Figure 3:
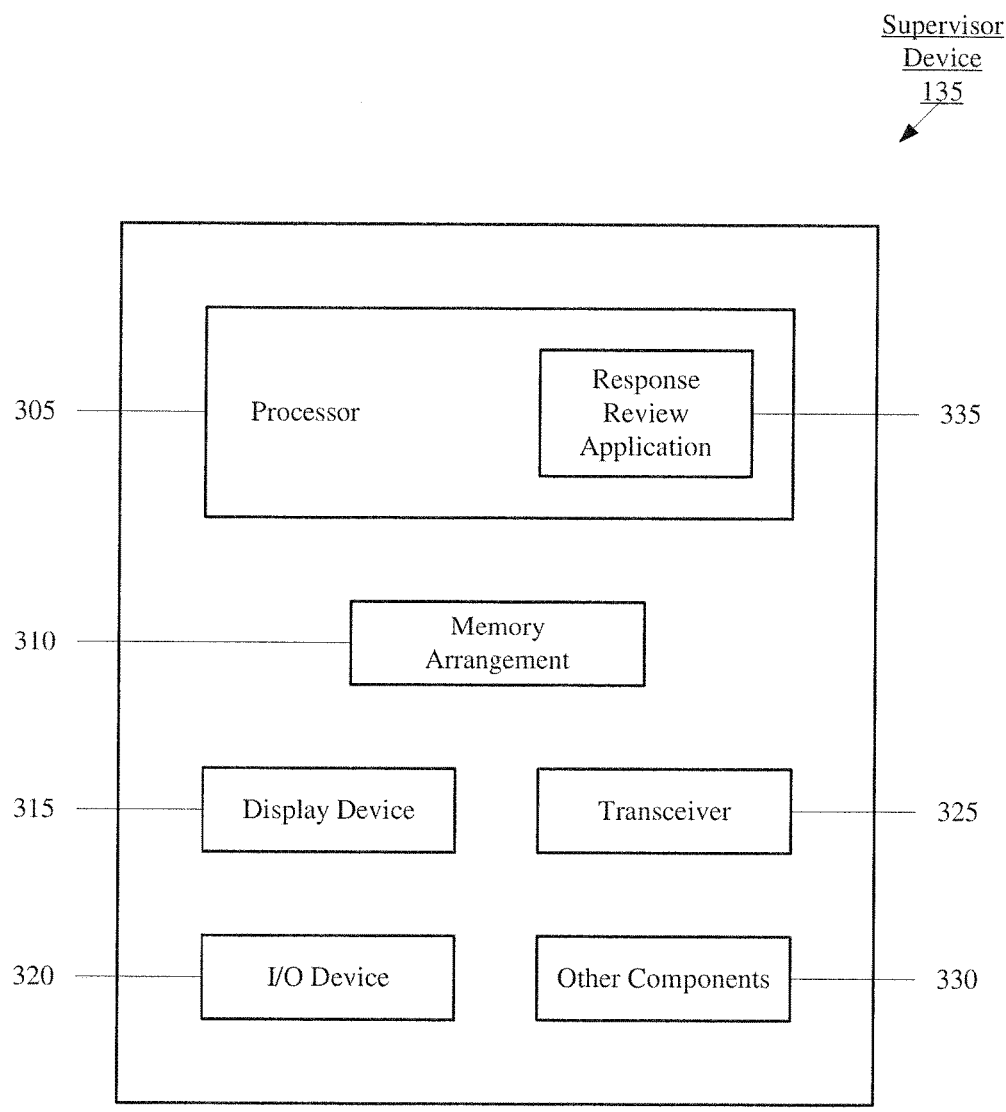
FIG. 3 shows an exemplary supervisor device of the contact center system of FIG. 1.

FIG. 3 shows the exemplary supervisor device 135 of the contact center system 100 of FIG. 1. As discussed above, the supervisor device 135 may be utilized by a supervisor to receive a response generated by an agent via the agent devices 120-130. The supervisor may be responsible for responses transmitted back to users by the agents using the agent devices 120-130. As such, the supervisor may approve or disapprove the responses prior to transmission to the users. In a substantially similar manner as the agent device 120, the supervisor device 135 may represent any electronic device that is configured to perform the functionalities described herein. The supervisor device 135 may also include a processor 305, a memory arrangement 310, a display device 315, an I/O device 320, a transceiver 325 and other components 330. These components may provide functionalities substantially similar to those corresponding to the agent device 120.

With regard to the supervisor device 135, the processor 305 may be configured to execute a plurality of applications of the supervisor device 135. For example, the supervisor device 135 may also execute a web browser and a call application in a substantially similar manner as the agent device 120. However, the supervisor device 135 may execute a response review application 335. The response review application 335 may be configured to enable the supervisor to analyze the response generated by the agent device 120. The response review application 335 may provide all pertinent information to the supervisor so that a determination may be made as to whether the response is proper for transmission to the user. Upon reviewing the response, the supervisor may determine that the response fully provides a proper reply to the request, thereby approving the response for transmission to the user. However, if the supervisor determines that the response does not provide the proper reply to the request, the supervisor may override or stop the transmission. The supervisor may forward the request back to the original agent or select a different agent to provide an updated response. The supervisor may also utilize the above described applications to provide the proper response. As described above, the responses forwarded to the supervisor device 135 may be controlled by the oversight device 140.

Figure 4:
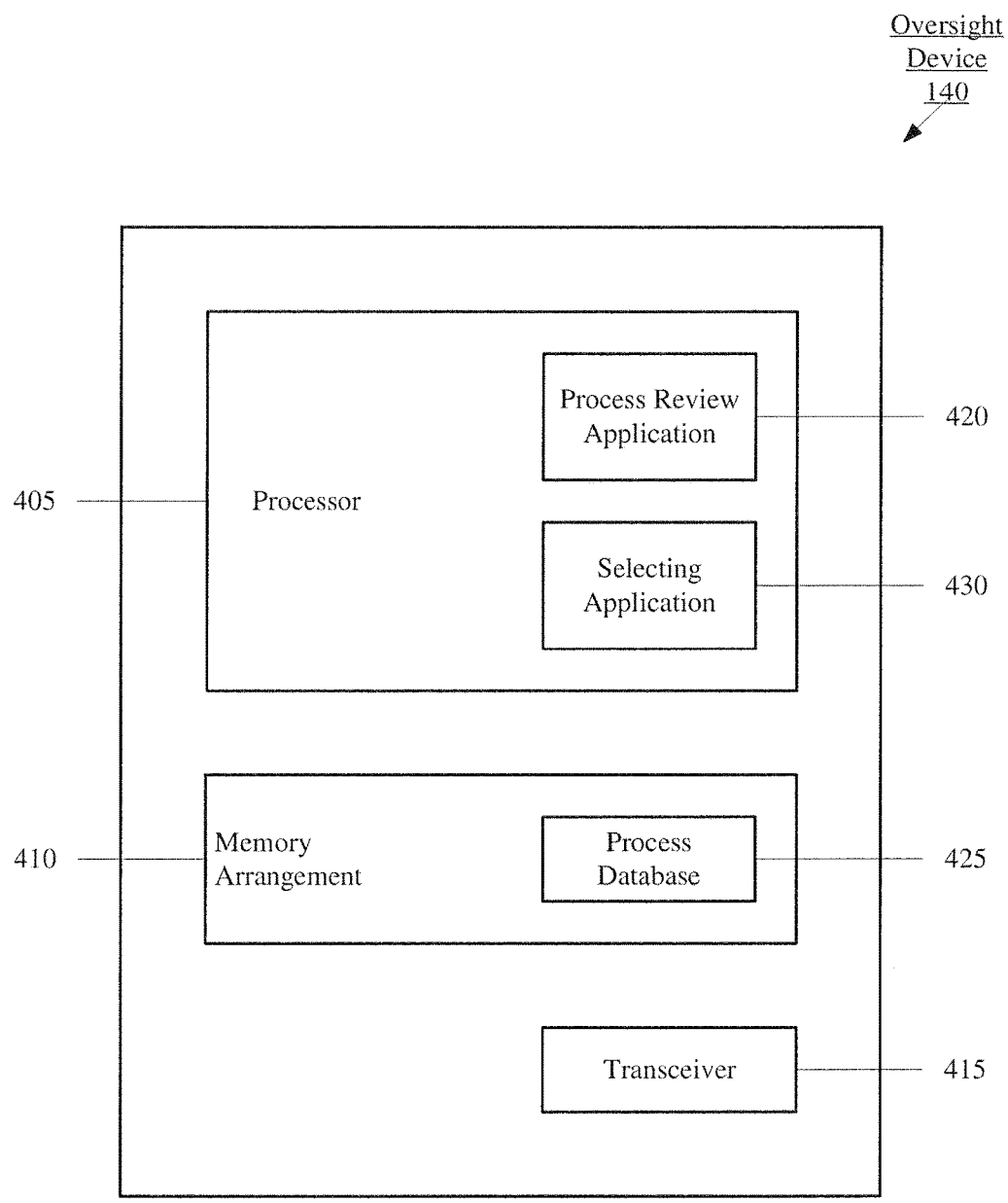
FIG. 4 shows an exemplary oversight device of the contact center system of FIG. 1.

FIG. 4 shows the exemplary oversight device 140 of the contact center system 100 of FIG. 1. As discussed above, the oversight device 140 may be a mechanism that selects responses to be forwarded to the supervisor device 135 for review. The oversight device 140 may be configured to automatically determine this selection upon being activated for the contact center system 100.

The oversight device 140 may be preconfigured with a variety of parameters to make the selections. For example, an administrator may pre-program the oversight device 140 to perform its intended functionality. In a substantially similar manner as the agent device 120 and the supervisor device 135, the oversight device 140 may represent any electronic device that is configured to perform the functionalities described herein. The oversight device 140 may include a processor 405, a memory arrangement 410, and a transceiver 415 that provide functionalities substantially similar to those corresponding to the agent device 120. It should be noted that the oversight device 140 may also include further components such as a display device and an I/O device that enable the administrator to configure the oversight device 140 to perform its intended functionalities.

However, it should also be noted that the oversight device 140 may be configured to receive these instructions via the transceiver 215 to automatically implement the policies upon reception.

The processor 405 may be configured to execute a process review application 420. The process review application 420 may receive the information from the tracking application 240 of the agent device 120. More specifically, the information regarding the process being used by the agent may be received by the process review application 420. As discussed above, the process review application 420 may receive the information in a variety of different manners such as continually, intermittently, and upon an action occurring. The process review application 420 may also receive the tags or indicators related to the request. Accordingly, the process review application 420 may have a basis in which to determine whether the process being used by the agent is correct and therefore properly determine whether the response requires any review.

The memory arrangement 410 may include a process database 425. The process database 425 may include a plurality of steps that are required, are recommended, are to be skipped, etc. for each type of request that the contact center is configured to handle. Therefore, by accessing the process database 425, the process review application 420 may determine whether each step being used by the agent corresponds to the list of steps respective to the request. If the process review application 420 determines that all required steps are performed by the agent, all recommended steps are also performed by the agent, and all omitted steps are not performed, the process review application 420 may determine that the response requires no review and the response may be submitted for transmission to the user device 105. However, if the process review application 420 determines that at least one of these parameters are not met, the process review application 420 may forward an indication to a selecting application 430.

The selecting application 430 may be configured to select the responses that are to be forwarded to the supervisor device 135. Specifically, according to the exemplary embodiments, when the selecting application 430 receives an indication from the process review application 420, the selecting application 430 may automatically select the corresponding response to be forwarded to the supervisor device 135. In addition, the selecting application 430 may be configured for a random sampling of responses to be forwarded to the supervisor device 135. In this manner, the supervisor device 135 may receive all responses that require review.

Additionally, the supervisor device 135 may receive other responses that require review based upon the response itself. Those skilled in the art will understand that all proper steps may be performed by the agent but may still result in an improper response such as through an inadvertent error (e.g., typographical error). The selecting application 430 may determine whether the context of the response warrants a review by the supervisor. Accordingly, these responses may be forwarded to the supervisor device 135. Furthermore, the supervisor device 135 may also receive other responses that may not require review but are randomly selected for review. It should be noted that the random sampling feature of the selecting application 430 may be subject to various parameters such as a number of reviews that are indicated by the process review application 420. For example, if the process review application 420 has provided a number of indications within a given time period exceeding a predetermined number (as well as consideration of responses determined for review by the selecting application 430), the random sampling feature may be disabled to allow the supervisor sufficient time to review the indicated responses that require review.

Using the above method, the exemplary embodiments may select work items (i.e., responses) to be reviewed by the supervisor by assessing the process an agent used to solve the request and using this information to determine if the response should be flagged for review or not. Accordingly, this enables all work items to be reviewed by the oversight device 140 as well as the process of how the response was completed to be reviewed. Therefore, the exemplary embodiments provide a mechanism to determine how the content is generated as well as the actual context of the response itself.

For determining whether a response is flagged for review based upon the process being used, the exemplary embodiments may utilize the process database 425 that includes a set of rules so that responses have steps that must be performed, should be performed, or must not be performed. As the agent is processing the request, the oversight device 140 may track all of the tools used by the agent and this information may feed into the decision as to whether or not the response is flagged for review. Examples of criteria in the set of rules may include whether tools were used and how they were used, what searches (if any) were performed, whether an expert was consulted, whether a calculator was used such as dealing with insurance quotes, whether diagnostic tools were used, whether an appropriate article in the knowledge based was consulted, etc.

It should be noted that the tracking application 240 may be a HTML5 agent desktop application that gathers the information utilizing a WebRTC data channel which in turn enables it to signal the resources utilized but also the manner in which the resources are used. This information may then be fed into the oversight device 140 for comparison with the process database 425 to determine whether or not the response is approved for transmission or requires review by the supervisor.

In a specific example where the exemplary embodiments may be utilized, a user using the user device 105 may contact an agent using the agent device 120 via email requesting a car insurance quote. The oversight device 140 may have already added a rule into the set of rules that an insurance quote calculator tool must be used for such a request (e.g., as indicated in a tag in the request). If the agent were to fail to use this insurance quote calculator in generating the response, the response may be tagged for review by the process review application 420 and selected to be forwarded by the selecting application 430.

Expanding on the above example, further rules may be added into the set of rules for car insurance quote requests. For example, a first further rule may be whether the type of vehicle is non-standard. If so, a second further rule may be that a particular article in the knowledge based must be accessed. Also, a third further rule may be that an expert must also be consulted. For these three further rules, three steps in the process must be performed by the agent. Should any of these steps not be completed prior to the final response being generated, the process review application 420 may tag the response for review.

Figure 5:
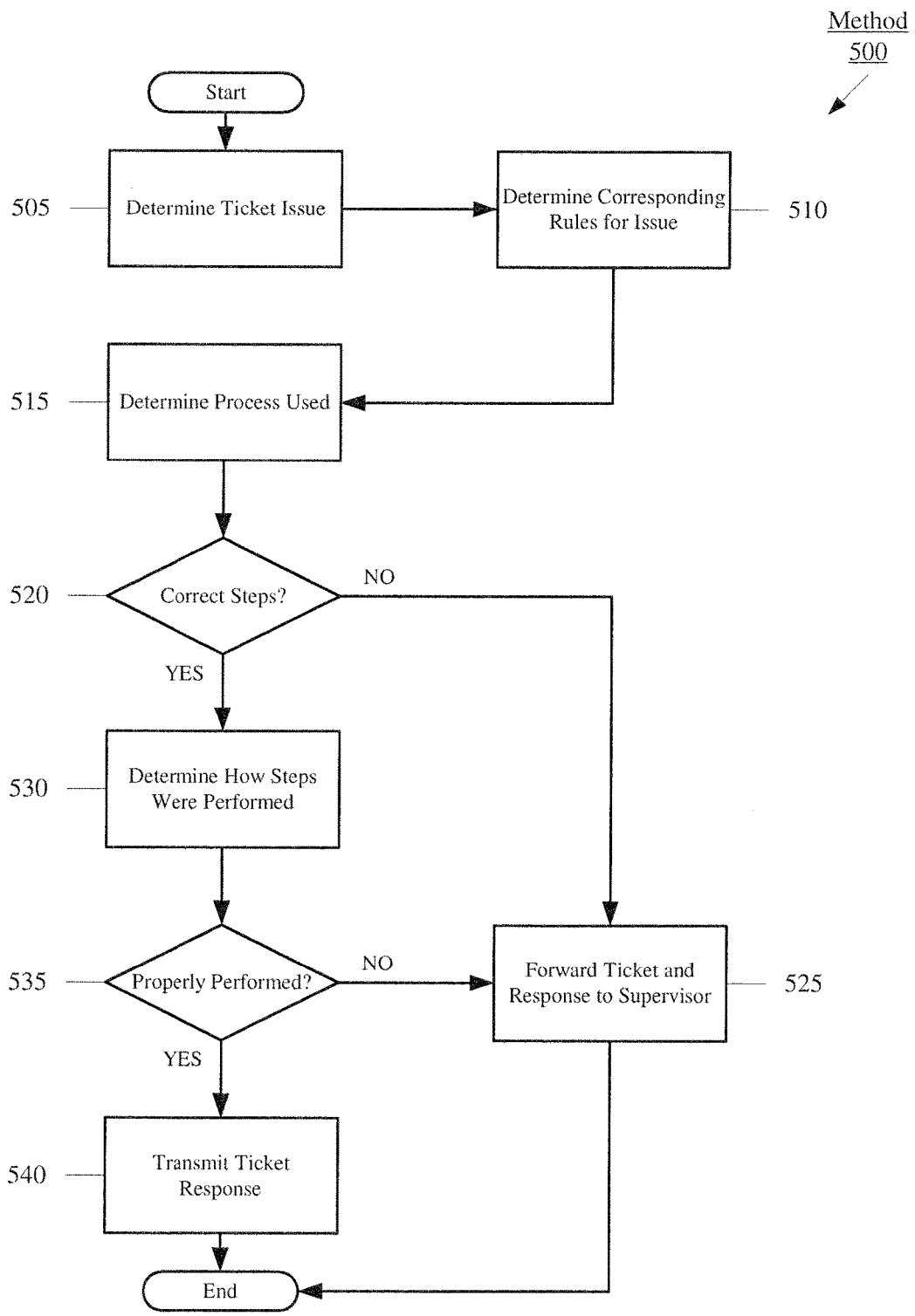
FIG. 5 shows an exemplary method for determining which responses generated by agents are to be reviewed by a supervisor.

FIG. 5 shows an exemplary method 500 for determining which responses generated by agents are to be reviewed by a supervisor. The method 500 may relate particularly to determining whether responses are to be reviewed based upon the process used by the agent in generating the response. The method 500 also relates to a time subsequent to the user of the user device 105 transmitting a request to the contact center. The method 500 will be described with regard to the contact center system 100 of FIG. 1, the agent device 120 of FIG. 2, the supervisor device 135 of FIG. 3, and the oversight device 140 of FIG. 4.

In step 505, the agent device 120 determines the issues of the ticket or request that was received from the user device 105. As discussed above, the request may include tags or indicators or the contact center may include text parsing applications to determine the issues based upon an analysis of what is provided by the user in the request. It should be noted that the issue may be used by the agent to determine the process to be used to generate the response. Furthermore, the issue may be provided to the process review application 420. Thus, in step 510, the process review application 420 may access the process database 425 to determine the corresponding set of rules to be used for the issue.

In step 515, the process review application 420 receives the information of the process being used and the steps thereof from the tracking application 240. As discussed above, the agent may utilize the ticket application 235 to run a process to generate the response including utilizing one or more tools and/or utilizing one or more applications to receive information. In step 520, the process review application 420 may determine whether the process includes the correct steps such as those that must be performed, those that should be performed, and those that should not be performed.

If the process review application 420 determines the agent has not used the correct steps in the process to generate the response, the process review application 420 may continue the method 500 to step 525 where the response if flagged for review for the selecting application 430 to select the response and forward the ticket and the agent's response to the supervisor. It should be noted that the timing of when this flag is marked may occur at a variety of times. In this instance, the process review application 420 may have determined that a step that must not be performed has been done by the agent. In such a scenario, the process review application 420 may automatically determine that the response must be reviewed even prior to the response being completed.

Returning to step 520, if the process review application 420 determines that the correct steps were taken in the process to generate the response, the process review application 420 may continue the method 500 to step 530. In step 530, the process review application 420 may determine how the steps were performed. This may provide even further information to the process review application 420. That is, an initial check may be performed in which the type of steps being performed is verified to correspond to the rules for the request. A subsequent check may be performed in which the manner of performing the steps is verified to correspond to the rules for the request. For example, although an insurance quote calculator is used, if used incorrectly, the process review application 420 may still conclude that the process is performed improperly. Thus, in step 535, the process review application 420 determines whether the steps were properly performed. If such a determination is made, the process review application 420 continues the method 500 to step 525. However, if the steps are also properly performed, the process review application 420 continues the method 500 to step 540. In step 540, the response is transmitted to the user. That is, the oversight device 140 has determined that no review is necessary as the process is performed correctly using the proper steps in the proper manner.

It should be noted that the method 500 may include a variety of other steps. As noted above, the method 500 is described with regard to the basis of how the process is performed. However, if other selecting factors are considered, the method 500 may be expanded. For example, a determination may be made whether the response is selected for random review. If selected, the method 500 may continue to step 525. In another example, a determination may be made whether the context of the agent's response is correct. If incorrect or improper, the method 500 may continue to step 525. In a further example, the supervisor may receive a response from the selecting application 430 based upon an indication received from the process review application 420. That is, the response was selected due to an improper process used by the agent in generating the response. However, the supervisor may determine that the response is still proper for transmission to the user. Thus, the method 500 may include an override step in which the supervisor still allows the response to be transmitted despite being selected by the process review application 420.

The exemplary embodiments provide a system and method of optimizing supervisor time by selecting agent responses for review prior to the response being transmitted to the user who provided the request for the response. Specifically, responses are selected for review based upon the process used by the agent in generating the response although other factors may also be used such as the context of the response itself or a random sampling. The process used by the agent may provide indications of whether the response has a high likelihood of being correct or proper or vice versa. That is, if the steps in the process used by the agent do not satisfy a set of rules corresponding to steps to be performed by the agent in addressing the request to generate the response, there is a high likelihood that the response is improper and warrants a review by the supervisor.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   receiving, by a transceiver of an oversight device, first data corresponding to a request received by a contact center, the first data including a type of the request, wherein the type of the request comprises an issue or a service of a plurality of issues or services handled by the contact center;
   in response to receiving the first data, automatically determining, by a processor of the oversight device, a set of rules corresponding to the type of the request, the set of rules indicating at least one required step to be performed by an agent for the type of the request;

receiving, by the transceiver of the oversight device, second data corresponding to a response process used by the agent in generating a response to the request, the response process including at least one performed step performed by the agent for the request;

in response to receiving the second data, automatically determining, by a processor of the oversight device, whether the at least one required step is included in the at least one performed step of the response process;

upon determining that the at least one required step is not included in the at least one performed step:

forwarding, by the transceiver of the oversight device, the response to a supervisor device for review instead of transmitting the response to a user device that transmitted the request; and after forwarding the response to the supervisor, receiving an override indication from the supervisor device to transmit the response to the user device.

2. The method of claim 1, further comprising:
transmitting the response to the user device when the at least one required step is present in the at least one performed step.

3. The method of claim 1, further comprising:
determining a further set of rules corresponding to the type of the request, the further set of rules indicating at least one required context data to be included in the response.

4. The method of claim 3, further comprising:
receiving the response, the response including at least one context data;
determining whether the at least one required context data is included in the at least one context data; and
forwarding the response to the supervisor device for review when the at least one required context data is absent from the at least one context data of the response.

5. The method of claim 1, further comprising:
forwarding the response to the supervisor device when selected for random sampling.

6. The method of claim 1, wherein the set of rules further indicates at least one proper manner in which the at least one required step is to be performed and wherein the second data further includes a respective manner in which each of the at least one performed step is performed by the agent.

7. The method of claim 6, wherein determining whether the agent used the tool correctly comprises:
determining, by the oversight device, whether the respective manner performed by the agent corresponds to the corresponding proper manner.

8. The method of claim 1, wherein the at least one required step includes a requirement that the agent use a tool of a plurality of tools, which is provided by an application executing on an agent device operated by the agent, and wherein the at least one required step is not included in the at least one performed step when the agent used the tool incorrectly for the type of the request.

9. The method of claim 1, wherein the response process includes one of use of at least one tool of the plurality of tools, receiving information from at least one source, and a combination thereof.

10. The method of claim 1, wherein the contact center is associated with an insurance service, the type of request is an insurance quote, and the tool comprises an insurance calculator.

11. An oversight device, comprising:
a transceiver configured to receive first data corresponding to a request received by a contact center, the first data including a type of the request, wherein the type of the request comprises an issue or a service of a plurality of issues or services handled by the contact center, the transceiver further configured to receive second data corresponding to a response process used by an agent in generating a response to the request, the response process including at least one performed step performed by the agent for the request; and a processor configured to, in response to receiving the first data, automatically determine a set of rules corresponding to the type of the request, the set of rules indicating at least one required step to be performed by the agent for the type of the request and the processor further configured to, in response to receiving the second data, automatically determine whether the at least one required step is included in the at least one performed step of the response process; and upon the processor determining that the at least one required step is not included in the at least one performed step, the transceiver further configured to forward the response to a supervisor device for review instead of transmitting the response to a user device that transmitted the request and, after the response is forwarded, the transceiver further configured to receive an override indication from the supervisor device to transmit the response to the user device.

12. The oversight device of claim 11, wherein the transceiver is further configured to transmit the response to the user device when the at least one required step is present in the at least one performed step.

13. The oversight device of claim 11, wherein the processor is further configured to determine a further set of rules corresponding to the type of the request, the further set of rules indicating at least one required context data to be included in the response.

14. The oversight device of claim 13, wherein the transceiver is further configured to receive the response, the response including at least one context data, the processor is further configured to determine whether the at least one required context data is included in the at least one context data, and the transceiver is further configured to forward the response to the supervisor device for review when the at least one required context data is absent from the at least one context data of the response.

15. The oversight device of claim 11, wherein the transceiver is further configured to forward the response to the supervisor device when selected for random sampling.

16. The oversight device of claim 11, wherein the set of rules further indicates at least one proper manner in which the at least one required step is to be performed and wherein the second data further includes a respective manner in which each of the at least one performed step is performed by the agent.

17. The oversight device of claim 16, wherein to determine whether the agent used the tool correctly comprises, the processor is configured to determine whether the respective manner performed by the agent corresponds to the corresponding proper manner.

18. The oversight device of claim 11, wherein the at least one required step includes a requirement that the agent use a tool of a plurality of tools, which is provided by an application executing on an agent device operated by the agent, and wherein the at least one required step is not included in the at least one performed step when the agent used the tool incorrectly for the type of the request.

19. The oversight device of claim 11, wherein the response process includes one of use of at least one tool, receiving information from at least one source, and a combination thereof.

20. A contact center system for a contact center, comprising:
- an agent device configured to receive a request from a user device that is of a type comprising an issue or a service of a plurality of issues or services handled by the contact center, the agent device further configured to generate first data corresponding to the request, the first data including the type of the request, the agent device further configured to receive agent inputs to perform a response process to generate a response to the request, the response process including at least one performed step performed for the request; and
- an oversight device configured to receive the first data, the oversight device further configured to, in response to receiving the first data, automatically determine a set of rules corresponding to the type of the request, the set of rules indicating at least one required step to be performed for the type of the request, the oversight device further configured to receive the second data, the oversight device further configured to, in response to receiving the second data, automatically determine whether the at least one required step is included in the at least one performed step of the response process, and, upon determining that the at least one required step is not included in the at least one performed step:
  - forward the response to a supervisor device for review instead of transmitting the response to the user device; and
  - after the response is forwarded, receive an override indication from the supervisor device to transmit the response to the user device.

* * * * *